(12) United States Patent
Jacklin et al.

(10) Patent No.: US 6,169,730 B1
(45) Date of Patent: Jan. 2, 2001

(54) WIRELESS COMMUNICATIONS PROTOCOL

(75) Inventors: William Edward Jacklin, Lombard; Scott Alan Stratmoen, Arlington Heights, both of IL (US)

(73) Assignee: Northrop Grumman Corporation, Los Angeles, CA (US)

( * ) Notice: Under 35 U.S.C. 154(b), the term of this patent shall be extended for 0 days.

(21) Appl. No.: 09/079,651

(22) Filed: May 15, 1998

(51) Int. Cl.[7] .................................................. H04B 7/212
(52) U.S. Cl. ........................ 370/321; 370/310; 455/461
(58) Field of Search ..................................... 370/337, 345, 370/347, 310, 315, 313, 321, 458, 465, 468, 348; 455/422, 435, 437

(56) References Cited

U.S. PATENT DOCUMENTS

| | | | |
|---|---|---|---|
| D. 265,402 | 7/1982 | Fukushima et al. | D14/68 |
| D. 267,249 | 12/1982 | Fukushima et al. | D14/68 |
| D. 298,242 | 10/1988 | Watanabe | D14/64 |
| D. 309,136 | 7/1990 | Siddoway | D14/137 |
| D. 339,128 | 9/1993 | Claxton et al. | D14/138 |
| D. 368,711 | 4/1996 | Wicks et al. | D14/138 |
| D. 378,678 | 4/1997 | Tyneski et al. | D14/137 |
| D. 378,816 | 4/1997 | Hino | D14/138 |
| D. 383,745 | 9/1997 | Lindeman et al. | D14/137 |
| D. 384,059 | 9/1997 | Hockenberry et al. | D14/137 |
| D. 385,269 | 10/1997 | Kim | D14/137 |
| D. 385,270 | 10/1997 | Yahaya | D14/137 |
| D. 393,260 | 4/1998 | Yahaya | D14/137 |
| D. 393,638 | 4/1998 | Page et al. | D14/137 |
| 3,916,312 | 10/1975 | Campbell | 325/16 |
| 3,917,372 | 11/1975 | Selinko | 339/75 |
| 4,025,721 | 5/1977 | Groupe et al. | 179/1 P |
| 4,031,468 | 6/1977 | Ziebell et al. | 325/312 |
| 4,052,568 | 10/1977 | Jankowski | 179/15 |
| 4,156,797 | 5/1979 | Hoole | 179/1 |
| 4,227,258 | 10/1980 | Root et al. | 455/348 |
| 4,277,645 | 7/1981 | May, Jr. | 179/1 |
| 4,325,142 | 4/1982 | Nakazawa | 455/89 |
| 4,374,301 | 2/1983 | Jrieder, Jr. | 179/1 |
| 4,417,102 | 11/1983 | Allen | 364/513 |
| 4,484,344 | 11/1984 | Mai et al. | 381/46 |
| 4,621,373 | 11/1986 | Hodsdon | 455/89 |
| 4,625,083 | 11/1986 | Poikela | 379/389 |
| 4,627,107 | 12/1986 | Hohlfeld et al. | 455/11 |
| 4,654,882 | 3/1987 | Ikeda | 455/88 |
| 4,682,367 | 7/1987 | Childress et al. | 455/17 |
| 4,734,049 | 3/1988 | George et al. | 439/259 |
| 4,754,484 | 6/1988 | Larkin et al. | 379/430 |
| 4,761,823 | 8/1988 | Fier | 455/89 |
| 4,882,746 | 11/1989 | Shimada | 379/61 |
| 4,903,325 | 2/1990 | Yoshitake et al. | 455/89 |
| 4,905,272 | 2/1990 | Van de Mortel et al. | 379/62 |
| 4,955,050 | 9/1990 | Yamauchi | 379/59 |
| 4,993,065 | 2/1991 | Chiou | 379/430 |
| 5,020,090 | 5/1991 | Morris | 379/58 |
| 5,023,936 | 6/1991 | Szczutkowski et al. | 455/90 |
| 5,038,400 | 8/1991 | Baracat et al. | 455/90 |
| 5,081,641 | 1/1992 | Kotzin et al. | 375/1 |
| 5,121,391 | 6/1992 | Paneth et al. | 370/95.1 |
| 5,121,504 | 6/1992 | Toko | 455/90 |
| 5,128,959 | 7/1992 | Bruckert | 375/1 |
| 5,133,001 | 7/1992 | Bohm | 379/58 |
| 5,140,628 | 8/1992 | Murata et al. | 379/61 |
| 5,170,494 | 12/1992 | Levanto | 455/90 |

(List continued on next page.)

*Primary Examiner*—Douglas W. Olms
*Assistant Examiner*—Ricardo M. Pizarro
(74) *Attorney, Agent, or Firm*—Terry J. Anderson; Karl J. Hoch, Jr.

(57) ABSTRACT

A method for implementing a time division multiple access protocol for digital communications between a radio transceiver and a repeater or another radio transceiver has the steps of dividing a radio communication into a plurality of frames having a predetermined length of time; dividing each frame into: a plurality of downlink slots, each downlink slot containing a transmission from the repeater to the transceiver; and a plurality of uplink slots, each uplink slot containing a transmission from the transceiver to the repeater.

40 Claims, 11 Drawing Sheets

U.S. PATENT DOCUMENTS

| | | | |
|---|---|---|---|
| 5,189,358 | 2/1993 | Tomura et al. | 320/2 |
| 5,191,593 | 3/1993 | McDonald et al. | 375/1 |
| 5,193,217 | 3/1993 | Lunn et al. | 455/79 |
| 5,230,016 | 7/1993 | Yasuda | 379/58 |
| 5,230,080 | 7/1993 | Fabre et al. | 455/15 |
| 5,247,567 | 9/1993 | Hirano | 379/61 |
| 5,255,308 | 10/1993 | Hashimoto et al. | 379/61 |
| 5,259,017 | 11/1993 | Langmantel | 379/58 |
| 5,259,020 | 11/1993 | Hirano | 379/61 |
| 5,261,121 | 11/1993 | Hashimoto | 455/89 |
| 5,263,047 | 11/1993 | Kotzin et al. | 375/1 |
| 5,265,150 | 11/1993 | Helmkamp et al. | 379/58 |
| 5,274,634 | 12/1993 | Babiarz | 370/60 |
| 5,276,680 | 1/1994 | Messenger | 370/85.1 |
| 5,276,765 | 1/1994 | Freeman et al. | 395/2 |
| 5,283,806 | 2/1994 | Dartois et al. | 375/1 |
| 5,283,817 | 2/1994 | Hara et al. | 379/61 |
| 5,293,588 | 3/1994 | Satoh et al. | 395/2.42 |
| 5,297,142 | 3/1994 | Paggeot et al. | 370/85.6 |
| 5,305,467 | 4/1994 | Herndon et al. | 455/56.1 |
| 5,325,419 | 6/1994 | Connolly et al. | 379/60 |
| 5,353,331 | 10/1994 | Emery et al. | 379/58 |
| 5,365,572 | 11/1994 | Saegusa et al. | 379/61 |
| 5,390,233 | 2/1995 | Jensen et al. | 379/58 |
| 5,406,615 | 4/1995 | Miller, II et al. | 379/59 |
| 5,408,496 | 4/1995 | Ritz et al. | 375/202 |
| 5,410,632 | 4/1995 | Hong et al. | 395/2.42 |
| 5,410,737 | 4/1995 | Jones | 455/56.1 |
| 5,416,828 | 5/1995 | Hiramatsu et al. | 379/58 |
| 5,440,613 | 8/1995 | Fuentes | 379/60 |
| 5,442,659 | 8/1995 | Bauchot et al. | 375/202 |
| 5,446,769 | 8/1995 | Shaver et al. | 375/202 |
| 5,448,757 | 9/1995 | Hirata | 455/43 |
| 5,459,814 | 10/1995 | Gupta et al. | 395/2.42 |
| 5,465,401 | 11/1995 | Thompson | 455/89 |
| 5,469,496 | 11/1995 | Emery et al. | 379/58 |
| 5,471,503 | 11/1995 | Altmaier et al. | 375/202 |
| 5,481,591 | 1/1996 | Suzuki | 379/58 |
| 5,487,175 | 1/1996 | Bayley et al. | 455/54.2 |
| 5,493,703 | 2/1996 | Yamashita | 455/89 |
| 5,504,803 | 4/1996 | Yamada et al. | 379/59 |
| 5,506,887 | 4/1996 | Emery et al. | 379/58 |
| 5,509,053 | 4/1996 | Gowda et al. | 379/63 |
| 5,509,406 | 4/1996 | Kock et al. | 128/203.14 |
| 5,513,248 | 4/1996 | Evans et al. | 379/61 |
| 5,519,763 | 5/1996 | Namekawa et al. | 379/61 |
| 5,533,097 | 7/1996 | Crane et al. | 379/58 |
| 5,555,448 | 9/1996 | Thiede et al. | 455/89 |
| 5,568,536 | 10/1996 | Tiller et al. | 379/58 |
| 5,574,775 | 11/1996 | Miller, II et al. | 379/60 |
| 5,579,535 | 11/1996 | Orlen et al. | 455/33.1 |
| 5,590,406 | 12/1996 | Bayley et al. | 455/54.2 |
| 5,590,417 | 12/1996 | Rydbeck | 455/89 |
| 5,594,777 | 1/1997 | Makkonen et al. | 379/58 |
| 5,594,952 | 1/1997 | Virtuoso et al. | 455/89 |
| 5,596,333 | 1/1997 | Bruckert | 342/457 |
| 5,602,843 | 2/1997 | Gray | 370/338 |
| 5,603,081 | 2/1997 | Raith et al. | 455/33.1 |
| 5,606,560 | 2/1997 | Malek et al. | 370/347 |
| 5,610,972 | 3/1997 | Emery et al. | 379/58 |
| 5,619,493 | 4/1997 | Ritz et al. | 370/330 |
| 5,619,553 | 4/1997 | Young et al. | 379/61 |
| 5,625,673 | 4/1997 | Grewe et al. | 379/61 |
| 5,625,877 | 4/1997 | Dunn et al. | 455/34.1 |
| 5,633,911 | 5/1997 | Han et al. | 379/58 |
| 5,640,689 | 6/1997 | Rossi | 455/89 |
| 5,649,055 | 7/1997 | Gupta et al. | 395/2.42 |
| 5,655,621 | 8/1997 | Yamashita et al. | 455/463 |
| 5,657,375 | 8/1997 | Connolly et al. | 455/436 |
| 5,657,422 | 8/1997 | Janiszewski et al. | 395/2.37 |
| 5,659,594 | 8/1997 | Toda | 455/552 |
| 5,659,882 | 8/1997 | Fukutomi | 455/524 |
| 5,659,890 | 8/1997 | Hidaka | 455/575 |
| 5,664,005 | 9/1997 | Emery et al. | 455/422 |
| 5,675,629 | 10/1997 | Raffel et al. | 379/58 |
| 5,710,764 * | 1/1998 | Yoshimura | 370/315 |
| 5,721,534 * | 2/1998 | Olds | 370/313 |
| 5,774,793 | 6/1998 | Cooper et al. | 455/89 |
| 5,812,933 * | 9/1998 | Niki | 370/315 |
| 5,901,359 * | 5/1999 | Malmstom | 455/461 |
| 5,905,443 * | 5/1999 | Olds | 370/310 |
| 5,953,339 * | 9/1999 | Baldwin | 370/465 |
| 5,956,343 * | 9/1999 | Cornes | 370/465 |
| 5,987,034 * | 11/2000 | Simon | 370/465 |

\* cited by examiner

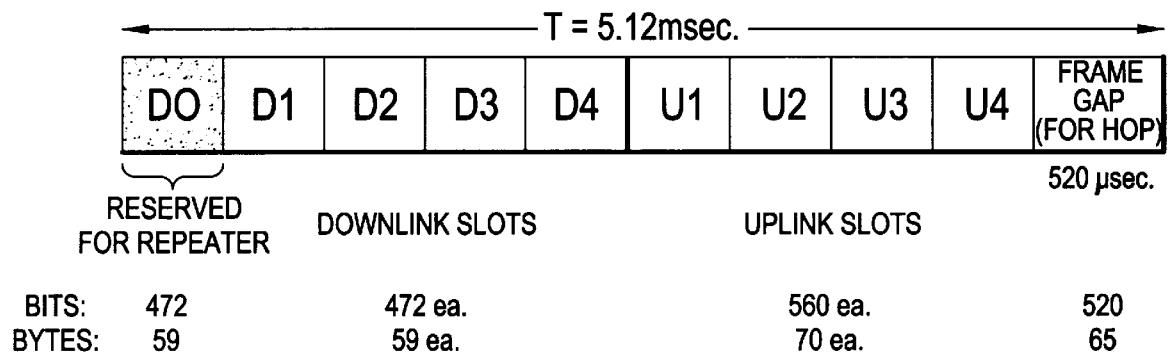
Fig. 9
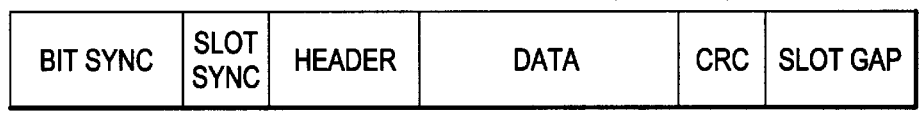
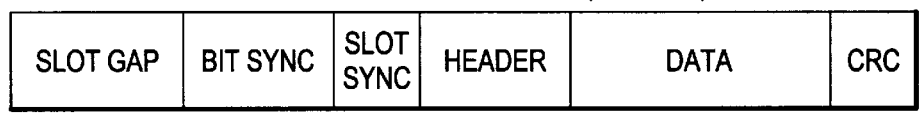
Fig. 10

| MESSAGE TYPE | MESSAGE SUBTYPE | ID | RESERVED | MODIFIER 1 | MODIFIER 2 |
|---|---|---|---|---|---|
| BITS: 8 | 8 | 8 | 8 | 8 | 8 |
| BYTES: 1 | 1 | 1 | 1 | 1 | 1 |

*Fig. 11*

| MESSAGE TYPE | MESSAGE SUBTYPE | ID | RESERVED | MODIFIER 1 | MODIFIER 2 |
|---|---|---|---|---|---|
| 80h | 00h | 00h | 00h | MAUSTONEROMOUS / CHANNEL # / ISMA BITS | RESERVED / ACTIVE SLOT |

*Fig. 12*

| MESSAGE TYPE | MESSAGE SUBTYPE | ID | RESERVED | MODIFIER 1 | MODIFIER 2 |
|---|---|---|---|---|---|
| 01h or 08h | 00h | 00h | 00h | MAUSTONEROMOUS / CHANNEL # / ISMA BITS | PTTS / RESERVED / ACTIVE SLOT |

*Fig. 13*

WIRELESS COMMUNICATIONS PROTOCOL

FIELD OF THE INVENTION

The present invention relates generally to digital wireless communications and more particularly to a protocol for use between radio transceivers and repeaters as well as between radio transceivers and radio transceivers.

BACKGROUND OF THE INVENTION

Wireless communications are well known. Such systems as walkie talkies, CB radios, and cellular telephones utilize wireless communications to facilitate point-to-point communications between individuals at different locations.

Such wireless communications systems typically utilize well known half duplex or talk-then-listen radio methodology wherein a user can listen to an incoming communication, or can speak, but not both simultaneously. Such half duplex wireless communication systems use either a push button control or the like or alternatively use a voice operated switch (VOX) to change the mode of the transceiver from receive to transmit.

While such contemporary wireless communication systems have generally been suitable for their intended purposes, they possess the inherent deficiency of requiring explicit actuation of the transmit mode via such a manually operated or automatic switch and also suffer from the inherent deficiency of not permitting an incoming communication when the transceiver is in the transmit mode.

Of course, requiring an operator to manually actuate the transmit mode, typically via a push button switch, necessitates that the operator use a hand (or possibly a foot) to key the microphone. Such explicit operation of the transceiver is not only a distraction, but may also be extremely undesirable in instances where the operator's hands (and possibly feet) are otherwise occupied. For example, tank drivers, aircraft pilots, helicopter pilots, etc., particularly when engaged in demanding maneuvers, may not be able to perform such manipulations, or may do so only at the risk of neglecting some other task which requires immediate attention.

Voice operated switches have been developed in an attempt to mitigate the problems associated with manually operated half duplex transceivers. However, such voice operated switches introduce an altogether new set of problems. Such problems include the operation of a voice operated switch in a high noise environment and the necessity of properly adjusting the sensitivity of the voice operated switch in such a high noise environment. As those skilled in the art will appreciate, high levels of ambient noise frequently result in the undesirable and inadvertent keying or actuation of the voice operated switch, such that no actual voice transmission is broadcast and the transceiver is prevented from accepting incoming transmissions.

Also, the user of such a voice operated switch in a high noise environment must speak louder than normal, so as to actuate even a properly adjusted voice operated switch. Such loud speaking can be fatiguing and may even result in hoarseness or other voice-related problems.

Regardless of what type of half duplex transceiver is utilized (manually actuated or VOX), another problem associated with such half duplex systems is the inadvertent keying thereof. Manually operated switches have an undesirable tendency to stick in the actuated position, thereby resulting in constant transmission and the inability to receive broadcasts from other transceivers. Thus, the operator who has such a stuck key can not even be notified by other individuals, who are listening to the inadvertent broadcast, that his key is stuck in the actuator position, since the individual who has the stuck key is incapable of receiving broadcasts due to half duplex operation of the transceiver. Further, as discussed above, voice operated switches may become inadvertently actuated due to high ambient noise levels.

As such, it is clear that a full duplex transceiver for point-to-point communications would be desirable.

Wire intercoms are also well known. Frequently, such intercoms are configured such that a plurality of users may talk simultaneously with respect to one another and each user may talk while listening to the conversations of a plurality of users. Thus, conversations via such wired intercoms tend to be much more natural than those taking place via wireless, half-duplex wireless communication systems.

It would further be desirable to provide intercom-like operation of the radio transceivers, such that they are capable of receiving a plurality of separate transmissions simultaneously, while the user is speaking. In this manner, each transceiver will pick up the broadcast of all other transceivers so as to provide a much more natural means for communication.

It would further be desirable to provide a comprehensive communications system which integrates wireless communications with wired intercom communications, such that persons utilizing a wired communications system, such as that of a tank, aircraft, helicopter, etc., may readily communicate among one another, and may also, simultaneously if desired, communicate with persons who are not part of the wired intercom system.

SUMMARY OF THE INVENTION

The present invention specifically addresses and alleviates the above-mentioned deficiencies associated with the prior art. More particularly, the present invention comprises a method for implementing a time division multiple access protocol for digital communications between a personal communication unit (PCU) which comprises a radio transceiver and a universal adapter interface (UAI) which comprises a repeater, or between one PCU and another PCU, or between one UAI and another UAI.

The method comprises the steps of dividing a communication into a plurality of frames having a predetermined length of time, and dividing each frame into a plurality of downlink slots, each downlink slot for containing a transmission from the repeater to the receiver and a plurality of uplink slots, each uplink slot for containing a transmission from the transceiver to the repeater or to another PCU. After the communication has been formatted according to the protocol of the present invention, it is transmitted.

The step of receiving the communication may comprise either receiving a voice communication or receiving a data communication.

The step of dividing the communication into at least one frame preferably comprises dividing the communication into at least one frame having a length of approximately 5.12 milliseconds. Those skilled in the art will appreciate that various other time periods are likewise suitable.

The steps of dividing each frame into a plurality of downlink slots and a plurality of uplink slots comprises dividing each frame into a plurality of paired downlink and uplink slots having corresponding indices.

According to the preferred embodiment of the present invention, a Medium Access Control (MAC) algorithm is used to provide fair access to available uplink slots.

A radio transceiver accesses an available uplink slot to transmit information to the repeater. Similarly, the repeater uses a corresponding downlink slot to transmit information to that particular radio transceiver. In this manner, the uplink slots and the downlink slots are tied to one another, preferably via a common indexing scheme.

According to the preferred embodiment of the present invention, a downlink slot $D_0$ is provided. The repeater transmits information to those radio transceivers that do not have an uplink slot via downlink slot $D_0$.

A frame gap is preferably formed intermediate adjacent frames to prevent adjacent frames from overlapping due to clock inaccuracies. The frame gap also facilitates synthesizer re-programming in a frequency hopping spread spectrum system.

The step of dividing each frame into a plurality of downlink slots and a plurality of uplink slots preferably comprise dividing each frame into downlink and uplink slots comprising: a bit synchronization field; a slot synchronization field for radio acquisition; a header field for control information; a data field for digital audio and digital data information; a CRC field for error detection; and a slot gap field for accommodating clock inaccuracies.

The step of dividing each downlink slot and each uplink slot into a CRC field preferably comprises within each downlink and each uplink slot a 16-bit CRC field.

The step of dividing each downlink slot and each uplink slot into a header field preferably comprises dividing each downlink slot and each uplink slot into a header field comprising: a message type field; a message subtype field; an ID field; a reserved field; a first modifier field; and a second modifier field.

The step of dividing each downlink slot and each uplink slot into an ID field preferably comprises dividing each downlink slot and each uplink slot into an ID field which facilitates transceiver to transceiver communications. As discussed in detail below, transceiver to transceiver communications may occur when a repeater is not available. Each downlink slot and each uplink slot preferably comprise an 8-bit message type field which facilitates the identification of 256 different message types.

These, as well as other advantages of the present invention will be more apparent from the following description and drawings. It is understood that changes in the specific structure shown and described may be made within the scope of the claims without departing from the spirit of the invention.

Brief Description of the Drawings

FIG. 9 shows a protocol frame format of the present invention;

FIG. 10 shows a protocol slot format of the present invention;

FIG. 11 shows the protocol header format of the present invention;

FIG. 12 shows a message format for a downlink voice transmission according to the present invention;

FIG. 13 shows a message format for an uplink voice transmission according to the present invention;

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention.

Figure 1:
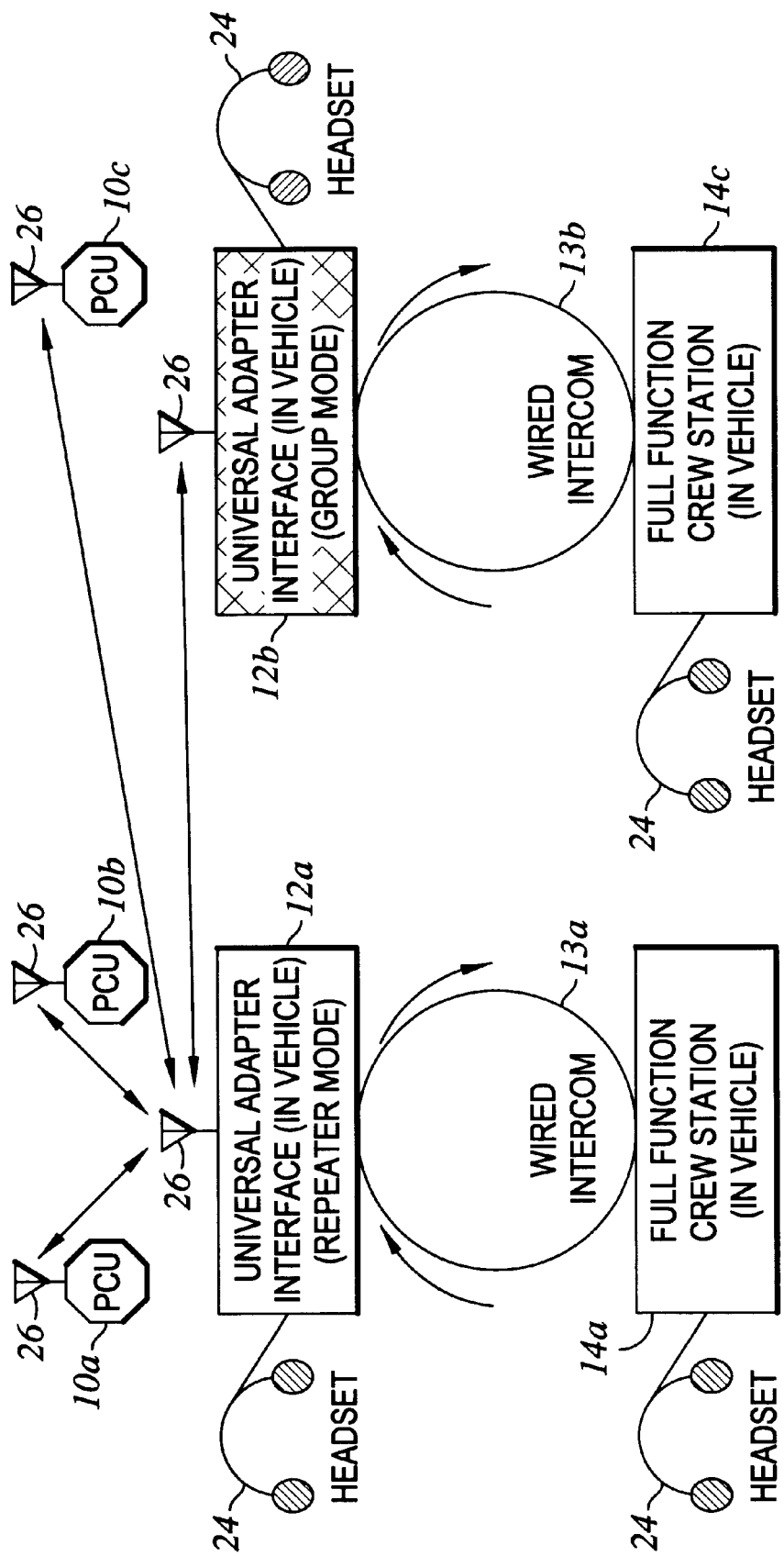
FIG. 1 is a schematic representation of the personal communications system of the present invention.

Referring now to FIG. 1, when at least one universal adapter interface (UAI) 12a is available, then all messages transmitted and received by each personal communications unit (PCU) 10a, 10b,10c, are routed through the UAI 12a which acts as a wireless network master. If more than one UAI 12a, 12b is available, then one of the UAI's 12a, 12b is designated as the master UAI 12a and the other is designated as the group UAI. In this mode, each PCU 10a, 10b, 10c transmits its audio signal to the master UAI 12a. The master UAI 12a then forms a composite audio intercom signal by summing together all of the various uplink PCU 10a, 10b, 10c transmissions received during a given time interval or frame. If any UAI 12a, 12b is connected to a wired intercom network 13a, 13b, then conversations from the wired intercom 12a, 13b are included in the overall composite audio signal as well.

The master UAI 12a transmits this composite audio signal to all of the PCU's 10a, 10b, 10c within range, either as a general broadcast signal or as a signal dedicated to a specific PCU 10a, 10b,10c, or both. In addition, the master UAI 12a may optionally transmit the wireless communications signals over the wired network, thereby providing a bridge between wireless PCU's 10a, 10b, 10c and wired intercom 10a, 10b.

Autonomous mode is a more complex mode of PCU 10a, 10b, 10c operation in which PCU's 10a, 10b, 10c initiate communications in the absence of a UAI 12a, 12b. A PCU 10a, 10b, 10c that is out-of-range of a UAI 12a, 12b is referred to herein as an autonomous PCU 10a, 10b, 10c.

Note that autonomous PCU's may initiate communications with other PCU's 10a, 10b, 10c already in a neighboring repeater-based network (one in which at least one UAI 12a, 12bis available), or with other autonomous PCU's 10a, 10b, 10c.

Figure 2:
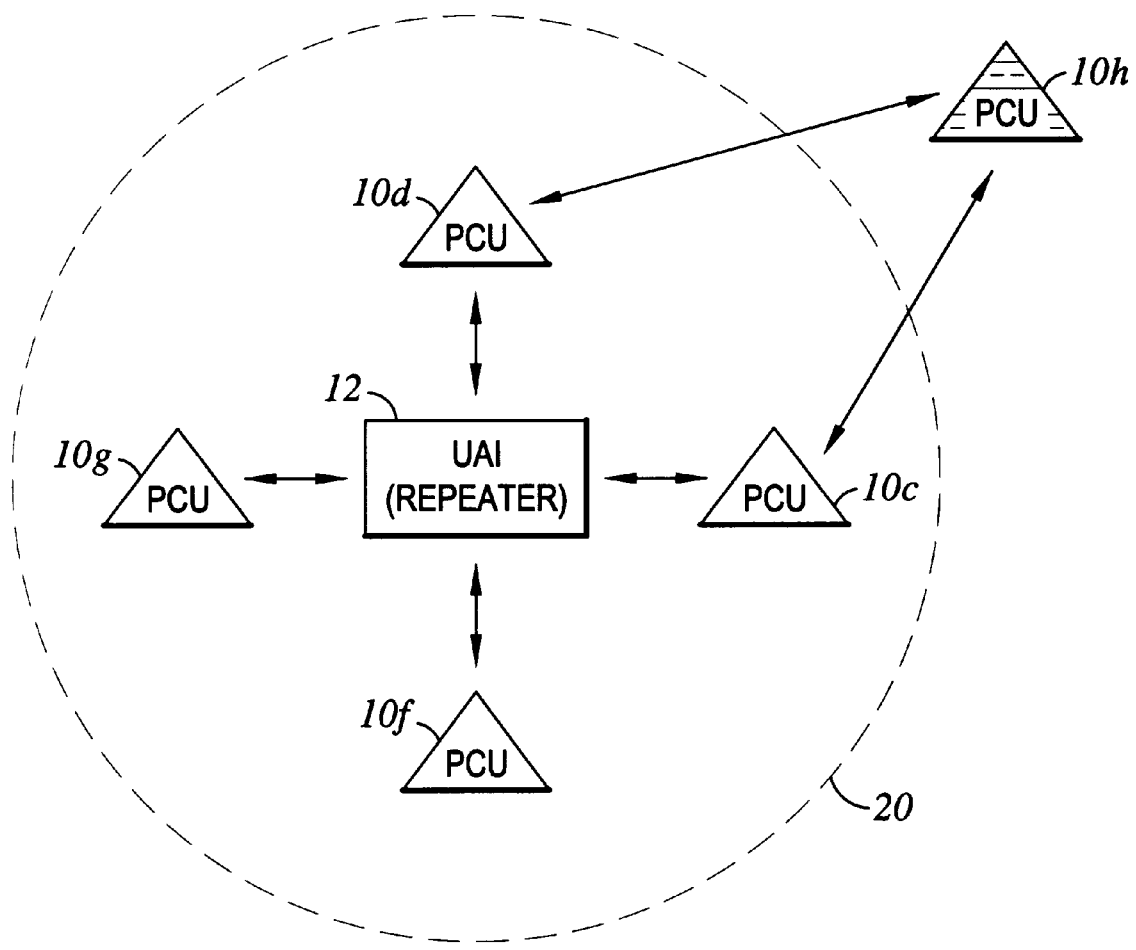
FIG. 2 is a block diagram of an exemplary network configuration according to the present invention.

Referring now to FIG. 2 a repeater-based network containing one UAI 12 and four PCU's 10d–10h is shown. PCU 10h is within range of PCU 10d and PCU 10e, but out-of-range of the UAI 12. To ensure useful, reliable information exchange: 1) PCU 10h preferably does not disrupt the existing repeater-based network, and 2) PCU 10h preferably is able to communicate with PCU 10d and PCU 10e.

These objectives are achieved through use of control fields contained in the messages transmitted by each PCU 10d–10h. Specifically, an autonomous PCU (such as PCU 10h) will search for uplink PCU 10d–10g transmissions which indicate that a PCU 10d–10g within listening range (PCU 10d or PCU 10e) is part of a repeater-based network (a network having at least one available UAI 12 ). Then, the autonomous PCU 10h will use the network status fields in these transmissions to determine the network availability and system timing in the neighboring network.

The autonomous PCU 10h will begin transmitting during time periods in which the neighboring network is inactive, and will include embedded control information that indicates that these messages correspond to an autonomous PCU 10h. In this way, PCU's 10d–10g in the neighboring network and within listening range of the autonomous PCU 10h will decode this control information and include the autonomous PCU's 10h messages in their composite audio signal.

In the event that an autonomous PCU 10h does not detect the presence of other PCU's 10d–10g, the autonomous PCU 10h will begin broadcasting if it has radio data to transmit. Other autonomous PCU's 10d–10h in the area will obtain network timing from this signal, and will establish communications using a procedure similar to the one described previously.

PCU's 10d–10h are also capable of initiating point-to-point voice communications in which two PCU 10d–10h users converse privately. For point-to-point operation, two PCU's 10d–10h use either a user-programmable identification (ID) number, or a read-only manufacturer ID number to provide network addressing. Also, in a repeater-based system (having at least one UAI 12), this conversation can use the same wireless medium as the voice intercom without interference.

Given that the communications system discussed herein employs a digital wireless medium, applications requiring digital data communications are supported as well. For example, some of the applications facilitated by this system architecture include: remote database access (e.g., for images, maps, etc.); remote report filing; reconnaissance (e.g., transmission of images and sounds to a centralized facility); and user-to-user data transfer.

Moreover, in a repeater-based network, digital data communications can occur simultaneously with point-to-point voice intercom communications over the same wireless medium without interference. To achieve this simultaneous operation, control information embedded in the PCU uplink and UAI downlink transmissions are used to route intercom and data messages to the appropriate PCU's.

A communications protocol for the present invention preferably utilizes a Time Division Multiple Access (TDMA) architecture in which each TDMA frame contains five (5) downlink and four (4) uplink slots, as discussed in detail below. Each slot is further divided into a synchronization field, a header field, a data field, and a CRC-16 field. In addition, Inhibit Sense Multiple Access (ISMA) is used as the Medium Access Control (MAC) algorithm for determining slot availability.

Figure 3:
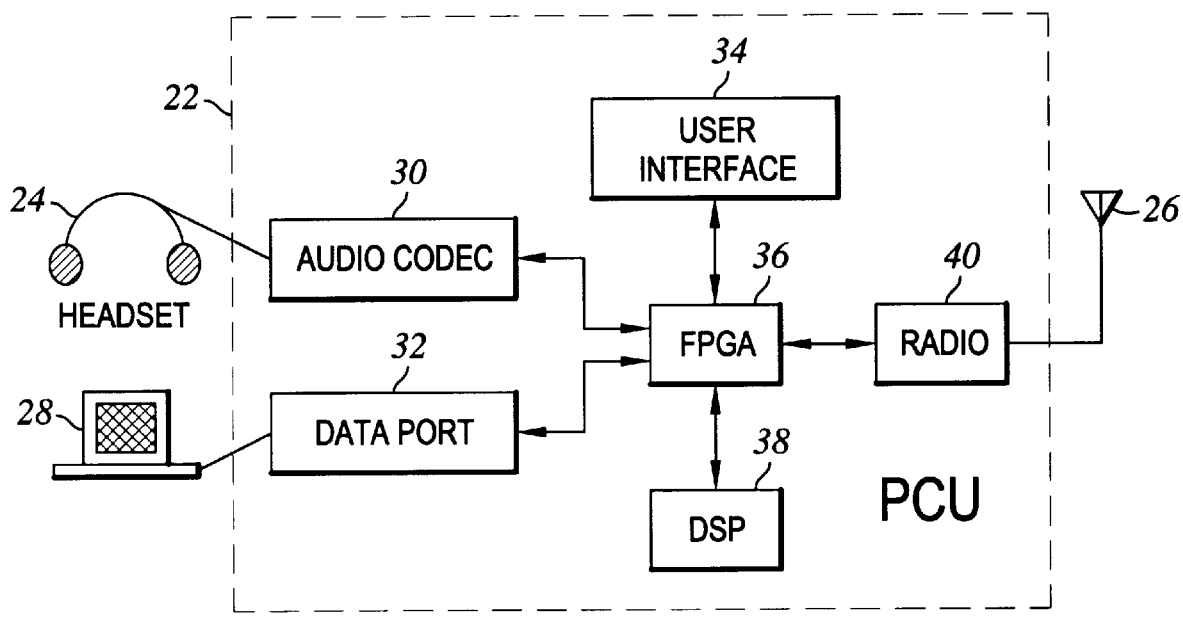
FIG. 3 is a block diagram of a personal communications unit according to the present invention.

Referring now to FIG. 3, the device architecture for each PCU 10a–10h is shown. The major components of a PCU 10a–10h include: an audio codec 30, a data port (e.g., an RS-232 interface) 32, a radio 40, an FPGA 36, and a DSP 38. The audio codec 30 provides an interface to an external headphone 24 and microphone (not shown), and/or an internal speaker (not shown) and microphone (not shown). The radio 40 functions as the interface to other PCUs and/or UAIs.

The data port 32 is used to interface the PCU 10a–10h with an external data terminal, for example, a personal computer 28. The user interface allows external control of the various PCU 10a–10h functions, for example, channel selection and volume control. The FPGA 36 acts as a data interface between all of these components and the DSP 38. Finally, the DSP 38 implements the control and signal processing algorithms used by the PCU 10a–10h.

The data flow and signal processing algorithms are as follows. The PCU 10a–10h processes two separate, asynchronous data streams: the audio input/output and the radio input/output. The timing for the radio input/output data stream is determined by the TDMA framing. Received radio data is buffered in the FPGA 36 and read by the DSP 38 once a complete TDMA slot is received. The DSP 38 decodes the header field and determines if the data field should be processed or ignored. If processing is required, the DSP 38 stores the data field in a circular buffer corresponding to the current TDMA slot. Conversely, radio data to be transmitted is written by the DSP 38 to a buffer in the FPGA 33. The DSP then writes control information to the radio 40, causing the radio 40 to transmit this data during the correct TDMA slot.

The sampling rate of the audio codec 30 determines the timing of the audio input/output data stream, and ultimately the timing of the PCU 10a–10h. Specifically, the audio codec 30 writes audio data received by the microphone to the DSP 38. The DSP 38 processes this data using a Voice Activated Switch (VOX) algorithm, or a push-to-talk (PTT) switch, to determine if speech is present. At the start of an audio frame the PCU 10a–10h determines which received radio data slot buffers contain valid data. Any valid radio data is summed with the input audio signal, to form a composite audio output. The audio output is written to the codec for transmission to the headphones 24 or speaker. Finally, if the VOX algorithm indicates that speech is present, or the PTT switch is actuated, the DSP 38 will use the audio input signal as the radio data to be transmitted during the next appropriate TDMA slot.

Besides data flow and signal processing, the DSP 38 also implements the control algorithms that cause the PCU 10a–10h to operate in and transition between the various protocol states, as well as the radio control processing (e.g., frequency hopping, transmit and receive timing output power control, etc.).

Figure 4:
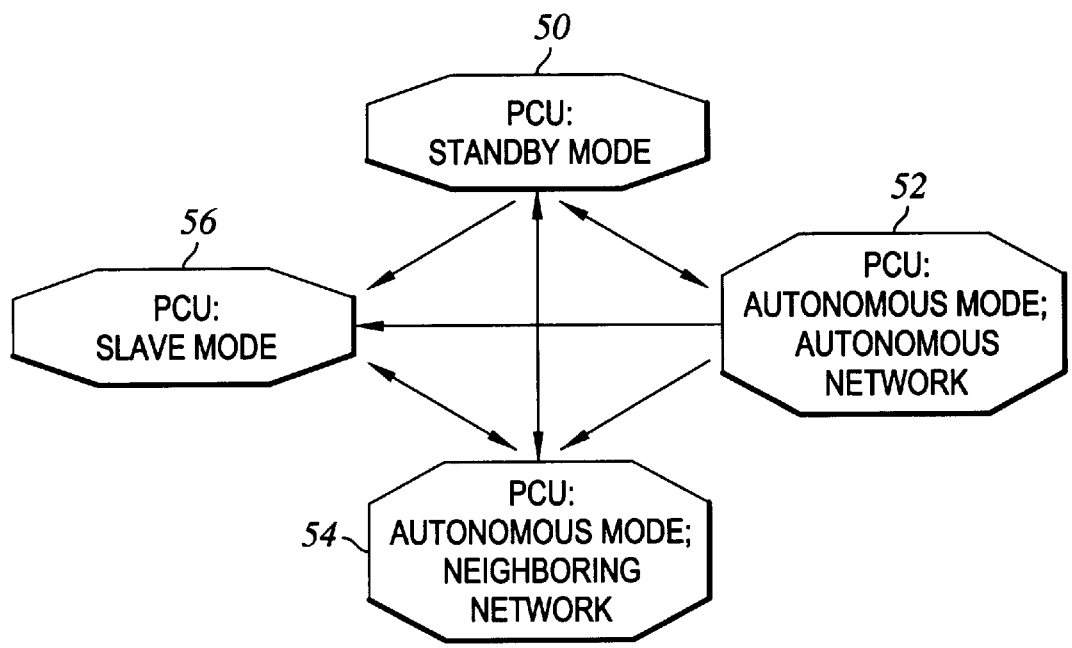
FIG. 4 is a flow chart showing the operational states of a personal communications unit of the present invention.

Referring now to FIG. 4, each PCU 10a–10h can be in one of four possible protocol states or modes: Standby mode 50, Slave mode 56, Autonomous mode—Neighboring network 54, and Autonomous mode—Autonomous network 52.

A PCU 10a–10h is in Slave mode 56 if it is linked to a master UAI 12a (FIG. 1). A PCU 10a–10h is in Autonomous mode—Neighboring network 54 if it is linked to PCU's 10a–10h that are members of a repeater-based network. A PCU is in Autonomous mode—Automous network if it is linked to PCUs that are not members of a repeater-based network. A PCU 10a–10h is in Standby mode 50 if it is attempting to determine the current network configuration. Referring now to FIGS. 5–8, the possible state/mode transitions, and the control processing that occurs within each possible state/mode are shown.

According to the preferred embodiment of the present invention the length of an audio frame equals the length of a TDMA frame. Since the audio and TDMA frames are typically offset with respect to one another, block data processing is used in which the start of the audio frame indicates the start of the block of data to be processed.

An example of a system architecture for versatile, wireless voice and data communications is depicted in FIG. 1. In general, this system contains two main components: repeaters, or Wireless Interface Adapters (UAIs) 12a, 12b, and Personal Communications Units (PCUs) 10a, 10b, 10c. In its standard mode of operation, a UAI 12a, 12b is a device that provides centralized control of the wireless network by receiving, processing and routing incoming PCU 10a, 10b, 10c transmissions. A PCU 10a, 10b, 10c is a device that provides an individual user with access to the wireless network. In its standard mode of operation, the PCU 10a, 10b, 10c requests network access from the corresponding UAI 12a, 12b, and begins transmitting once access is granted. In this mode, messages transmitted and received by the PCU 10a, 10b, 10c are routed through the UAI 12a, 12b. However, the PCU's 10a, 10b, 10c are also capable of forming a network in the absence of a UAI 12a, 12b. In this case, the PCUs use distributed control to establish the network and grant network access. Note that the switch between centralized and distributed controls occurs automatically and seamlessly as the network topology changes.

UAIs 12a, 12b in a wireless intercom network may also be connected to wired intercom. As such, the UAI 12a, 12b acts as a bridge between users of the wireless intercom and users of the wired intercom. The UAI 12a, 12b sends the composite wired and wireless intercom voice signal to the wireless users during its downlink transmissions. Conversely, the UAI 12a, 12b combines all uplink wireless messages to form a composite signal that is transmitted to all wired intercom users. A more detailed discussion regarding the intercom communications is provided in the next section.

System operation for the case of wireless voice intercom communications is discussed below. In this case, the system components (UAI 12a, 12b and PCUs 10a, 10b, 10c) may operate in one of three modes: repeater mode, autonomous mode and group mode.

Repeater mode is the standard mode of network operation in which the UAI 12a, 12b is the wireless network master. In this mode the UAI 12a, 12b receives multiple uplink transmissions from a number of PCUs 10a, 10b, 10c. The UAI 12a, 12b then forms a composite audio intercom signal by summing together all of the uplink PCU transmissions received during a given time interval, or frame. If the UAI 12a, 12b is also connected to a wire intercom network, it can include those conversations in the overall composite audio signal as well. Finally, the UAI 12a, 12b transmits this composite audio signal to all PCUs 10a, 10b, 10c in range. In addition, the UAI 12a, 12b may transmit the wireless intercom signals over the wired network, thereby providing a bridge between wired and wireless intercom users.

Autonomous mode is the more complex mode of network operation in which PCUs 10a, 10b, 10c initiate communications in the absence of a UAI 12a, 12b. A PCU 10a, 10b, 10c that is out-of-range of a UAI is called an autonomous PCUs 10a, 10b, 10c. Note that autonomous PCUs 10a, 10b, 10c may initiate communications with other PCUs 10a, 10b, 10c already in a neighboring, repeater-based network, or with other autonomous PCUs 1a, 10b, 10c.

Given that the system architecture discussed herein employs a digital wireless medium, applications requiring digital data communications are supported as well. For example, some of he applications facilitated by this system architecture include:

Remote database access (e.g., for images, maps, etc.);
Remote report filing;
Reconnaissance (e.g., transmission of images and sounds to a centralized facility); and
User-to-user data transfer.

Moreover, in a repeater-based network, digital data communications can occur simultaneously with point-to-point voice intercom communications over the same wireless medium without interference. To achieve this simultaneous operations, the UAI uses control information embedded in the uplink and downlink transmissions to route intercom and data messages to the appropriate PCUs.

The system architecture preferably has the characteristics listed below:

TABLE 1

System Characteristics

| Parameter | Value | Comment |
| --- | --- | --- |
| Range | 1500 ft. typical | |
| Channel type | Time division duplex, frequency simplex | |
| Data rate | 1 Mbps | |
| Physical layer | Frequency hopping spread spectrum | FCC complaint in the 2.45 GHz ISM band |
| No. of hopping | 75 | Per FCC 15.247 |
| Operating frequency range | 2400–2483.5 MHz | Per FCC 15.247 |
| Number of distinct channels | 64 | Each channel is assigned a distinct hopping pattern |
| Physical layer frame format | Time division multiple access (TDMA) | 4 uplink slots; 1 repeater downlink slot; 4 dedicated downlink slots |
| Number of simultaneous intercom talkers | 4 PCUs transmitting, and a wired intercom if connected to the UAI; | unlimited number of listeners |
| Medium access control (MAC) layer | Inhibit sense multiple access (ISMA) | |
| Networking modes | Repeater-based, autonomous, and group | |
| Echo suppression | UAI controlled | Facilitated by the dedicated downlink slots and an echo suppression algorithm |
| Sidetone | Locally generated | |
| Audio format | 8 bit $\mu$-law PCM | |

The method for implementing a time division multiple access protocol for digital communications according to the present invention is illustrated in FIGS. 2 and 9–15, which depict a presently preferred embodiment thereof.

The protocol described herein was developed for use in wireless communications system containing multiple Personal Communication Units (PCUs) and multiple repeaters. A PCU is a device that provides a user with access to the wireless network. A repeater is a device that controls the wireless network traffic and may be connected to an additional wired network. To achieve the system features discussed previously, the protocol utilizes a Time Division Multiple Access (TDMA) architecture that provides multiple users with simultaneous access to the transmission medium.

Referring now to FIG. 9, the protocol is divided into frames that are transmitted sequentially in time. Each frame contains a number of TDMA slots D0-U4. Slots D1 through D4 and U1 through U4 are downlink (transmission from repeater to PCU) and uplink (transmission from PCU to repeater) slots, respectively. Usually, downlink and uplink slots having the same index (e.g., D1 and U1) are linked to form a downlink-uplink slot pair. In a typical system, multiple PCUs will use a Medium Access Control (MAC) algorithm to access the available uplink slots. Once a PCU obtains access to an uplink slot, it receives transmissions from the repeater during the corresponding downlink slot. Those PCUs that do not have access to an uplink slot will receive broadcast repeater transmissions during the downlink slot D0. Finally, a frame gap is provided so that frames do not overlap due to clock inaccuracies, and for synthesizer re-programming in a Frequency Hopping (FH) Spread Spectrum (SS) system.

Referring now to FIG. 10, each slot in the protocol frame is segmented into a number of fields. Each slot contains a preamble and slot sync field for radio acquisition, a header field for control information, a data field for audio and digital information, a 16-bit CRC field for error detection, and a slot gap to allow for clock inaccuracies.

Referring now to FIG. 11 the header format for all slots is depicted. The generic format of the header permits protocol "layering" and the reserved field permits future protocol growth. Also, the user-programmable ID field permits the point-to-point communications previously discussed.

The eight (8) bit Message type field permits 256 possible types of messages. Those currently defined are listed in Table 1 and discussed in the following sections.

TABLE 1

Defined Message Types

| MESSAGE TYPE | DESCRIPTION |
|---|---|
| 80h | Downlink voice message |
| 01h | Uplink voice message for PCUs in a repeater-based network, or in range of PCUs in a repeater-based network |
| 08h | Uplink voice message for autonomous PCUs out of range of a repeater |
| 00h, 02h-07h, 09h-7fh, 81h-FFh | To be defined (for point-to-point conversations, data communications, testing, etc. |

This section describes the message types used to provide voice intercom communications. In the standard repeater mode of network operation, the repeater receives multiple uplink transmissions from a number of PCUs. The repeater then forms a composite audio intercom signal by summing together all of the uplink PCU transmissions received during a given protocol frame. If the repeater is also connected to a wired intercom network, it can include those conversations in the overall composite audio signal as well,. Finally, the repeater transmits this composite signal to all PCUs in range using the appropriate downlink slots. In addition, the repeater may transmit the wireless intercom signals over the wired network, thereby providing a bridge between wired and wireless intercom users.

Referring now to FIG. 12, voice intercom transmissions sent by a repeater during a downlink slot use Message Type 80h. For Message Type 80h, the Message Subtype, ID, and Reserved fields for standard voice intercom communications are unused and are set to 00h. The "Master" and "Autonomous" bits are interpreted according to Table 2. For downlink transmission, the repeater will send (Master, Autonomous)=(1, 0).

TABLE 2

Interpretation of Master and Autonomous Bits

| Bit | Bit | Interpretation |
|---|---|---|
| 0 | 0 | A PCU in slave mode, or a repeater in Group mode and slaved to a master repeater. |
| 0 | 1 | A PCU or a repeater (Group mode) in automous-slave mode |
| 1 | 0 | A repeater in master mode. |
| 1 | 1 | A PCU or a repeater (Group mode) in autonomous-master mode. |

The six (6) channel bits are used to represent up to 64 distinct wireless channels. The Inhibit Sense Multiple Access (ISMA) bits are interpreted according to FIG. 14, and are used to facilitate MAC processing. The "reserved" bit is currently unused and set to 0. Finally, the "Active Slot" bit field is used to represent the current active slot, and is interpreted according to Table 3.

TABLE 3

Interpretation of Active Slot Bit Field

| Active Slot Field | Interpretation |
|---|---|
| 100 | Repeater transmitting in Slot D0 |
| 100 | Repeater transmitting in Slot D1 |
| 001 | Repeater transmitting in Slot D2 |
| 010 | Repeater transmitting in Slot D3 |
| 011 | Repeater transmitting in Slot D4 |

Referring now to FIG. 13, voice intercom transmissions sent by PCU (or repeater in Group mode) during an uplink slot use Message Type 01h, as shown in FIG. 13. As for Message Type 80h, the Message Subtype, ID, and Reserved fields for standard voice intercom communications are currently unused in Message Type 01h, the "Master" and "Autonomous" bits are interpreted according to Table 2, and the six (6) channel bits are used to represent up to 64 distinct wireless channels.

Figure 14:
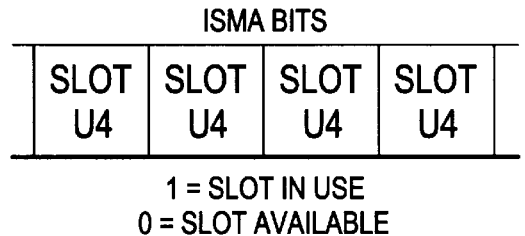
FIG. 14 shows the interpretation of The Inhibit Sense Multiple Access (ISMA) bits according to the present invention.

Referring now to FIG. 14, the ISMA bit field is interpreted as shown, if (Master bit, Autonomous bit)=(0, 0), otherwise the ISMA bits are ignored. The "PTT" equals "1" if the push-to-talk switch on the PCU is depressed, otherwise it is set to "0". The "Reserved" bit is currently unused and set to "0". Finally, the "Active Slot" bit field is used to represent the current slot, and is interpreted according to Table 4.

TABLE 4

Interpretation of Active Slot Bit Field

| Active Slot Field | Interpretation |
| --- | --- |
| 00 | PCU transmitting in Slot U1 |
| 01 | PCU transmitting in Slot U2 |
| 10 | PCU transmitting in Slot U3 |
| 11 | PCU transmitting in Slot U4 |

In Inhibit Sense Multiple Access (ISMA), the network master (repeater) transmits information regarding slot availability. PCUs use this information to randomly access one of the available uplink TDMA slots. Specifically, the ISMA technique used in this protocol is as follows:

1. The repeater transmits a busy/free flag for each TDMA slot in a frame;
2. PCUs in the network echo the ISMA information in their uplink header field.
3. PCUs do not attempt to access a slot that is busy;
4. PCUs will randomly attempt to access slots that are free;
5. After accessing a slot, a PCU monitors the busy/free flag for that slot during the next few frames. If the flag is not set to busy after a predetermined number of frames, the PCU stops transmitting since its transmission was not received by the repeater, most likely due to a collision with another PCU transmission.

Repeater mode is the standard mode of network operation in which the repeater is the wireless network master. In this mode, the repeater determines the network timing (e.g., frame start and end) and facilitates downlink-uplink slot pairing.

Autonomous mode is the more complex mode of network operation in which PCUs initiate communications in the absence of a repeater. A PCU that is out-of-range of a repeater is called an "autonomous PCU". Note that autonomous PCUs may initiate communications with other PCUs already in a neighboring, repeater-based network, or with other autonomous PCUs.

Referring again to FIG. 2, a repeater-based network containing a repeater 12 and four (4) PCUs 10d–10h is shown. PCU 10h is within range of PCU 10d and PCU 10e, but out-of-range of the repeater 12. As discussed above, to ensure useful, reliable information exchange: 1) PCU 10h should not disrupt the existing repeater-based network, and 2) PCU 10h should be able to communicate with PCU 10d and PCU 10e. These goals are achieved through use of the ISMA, Master, and Autonomous bits, and the Active Slot field in message type 01h. Specifically, an autonomous PCU (PCU 10h) will look for uplink slot transmissions with (Master, Autonomous)=(0, 0), which indicates that the PCU (PCU 10d or PCU 10e) within listening range is part of a repeater-based network. Then, the autonomous PCU 10h will decode the ISMA bits echoed in the received message header to determine the slot availability in the neighboring network. Finally, the autonomous PCU 10h will use the Active Slot field to determine the system timing of the neighboring network, and will begin transmitting during one of the available slots, using Message Type 01h with (Master, Autonomous)=(0, 1). PCU 10a–10g, in the neighboring network and within listening range of the autonomous PCU 10h will decode this Master-Autonomous PCU's message in their composite intercom audio signal.

Figure 15:
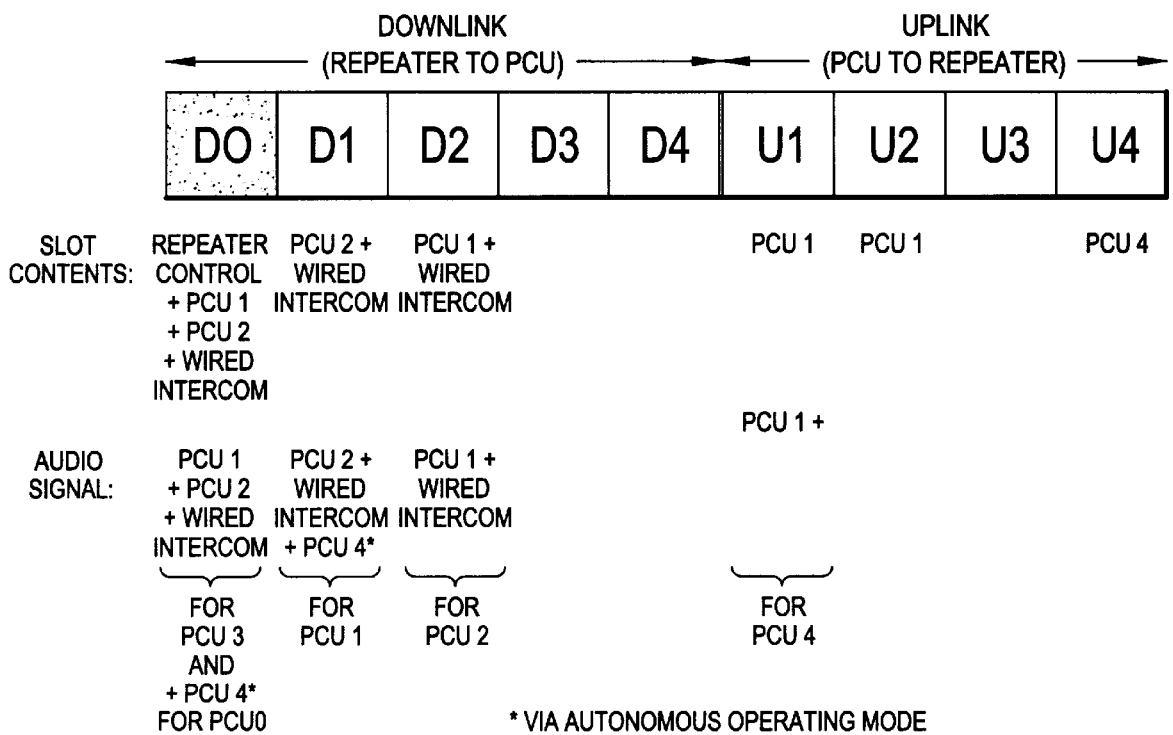
FIG. 15 shows protocol slot usage for autonomous mode operation with a neighboring network, according to the present invention.

Referring now to FIG. 15, the protocol slot contents and resulting intercom audio signals for this example are depicted for the repeater-based network shown in FIG. 2 with PCUs 10d–10g in range of the repeater and autonomous PCU 10h in range of PCUs 10d and 10e.

In the event that an autonomous PCU does not detect the presence of other PCUs, the autonomous PCU will start broadcasting Message Type 08h with (Master, Autonomous)=(1, 1), and with the ISMA bits and Active Slot field set to indicate that slot U1 is active. Other autonomous PCUs in the area will obtain network timing from this signal, and will establish communications using Message Type 08h with (Master, Autonomous)=(0, 1) and a procedure similar to the one described previously.

Repeaters in the wireless intercom network may also be connected to a wired intercom. As such, the repeater acts as a bridge between users of the wireless intercom and users of the wired intercom. The repeater sends the composite wired intercom voice signal to the wireless users during its downlink slot transmission. Conversely, the repeater combines all wireless transmission received in the uplink slots to form a composite signal that is transmitted to all wired intercom users.

The Group mode of operation can be used to connect two or more wired intercom networks together, along with other wireless intercom users. Specifically, a repeater in Group mode is configured to function as a PCU having the wired intercom as its audio input signal. Since the repeater acts as a PCU, it can communicate with other repeaters and PCUs using the repeater and autonomous modes discussed previously.

Point-to-point voice communications in which two users converse privately are also possible within the framework of this protocol. For this mode of operation, two PCUs would use either the user-programmable ID header field, or a read-only manufacturer ID number to direct messages between each other and not over the intercom network. Also, in a repeater-based system, this conversation can use the same wireless medium as the voice intercom without interference. Note that additional message types (i.e., a subset of the types 00h, 02h–07h, 09h–7Fh, 81h–FFh in Table 1) will be defined to support point-to-point communications.

In the repeater-based network of the present invention, digital data communications can occur simultaneously with point-to-point voice intercom communications over the same wireless medium without interference. Note that additional message types (i.e., a subset of the types 00h, 02h–07h, 09h–7Fh, 81h–FFh in Table 1) will be defined to support data communications.

Flow charts showing the operation of the present invention are provided in FIGS. 5–8, which are discussed in detail below.

Figure 5:
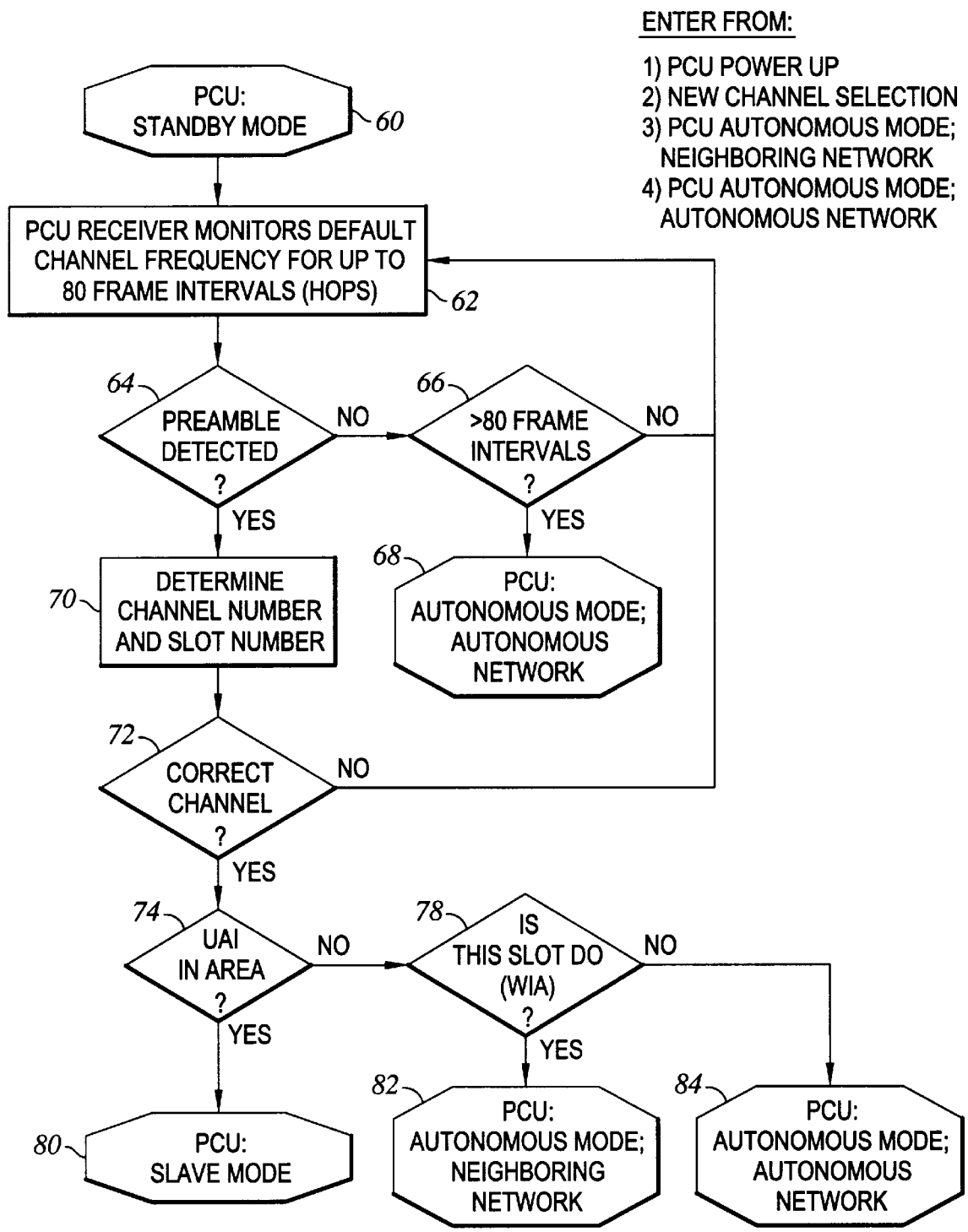
FIG. 5 is a flow chart showing the stand-by mode of a personal communications unit of the present invention.

With particular reference to FIG. 5, a flow chart of the PCU standby mode is provided. The PCU standby mode 60 may be entered from PCU power up, new channel selection, PCU autonomous mode-neighboring network, or PCU autonomous mode-autonomous network.

The PCU receiver monitors 62 the default channel frequency for up to 80 frame intervals or frequency hops. If no preamble is detected 64, then a check is made to see if more than 80 frame intervals have passed. If not, then the PCU continues to monitor 62 the default channel. If greater than 80 frame intervals have passed, the PCU commences autonomous mode—autonomous network operation 68.

When a preamble is detected 64, then the channel number and slot number 70 are determined. If the channel is not correct 72, then the PCU monitors 62 the default channel again. If the channel is correct 72, then the message type is decoded. If a downlink slot message type 80*h* is received, then the PCU enters 80 to slave mode. If an uplink slot message type 01*h* is received, the PCU enters 82 the autonomous mode-neighboring network. Otherwise, if an uplink slot message type 08*h* is received, then the PCU enters the autonomous mode-autonomous network 84.

Figure 6:
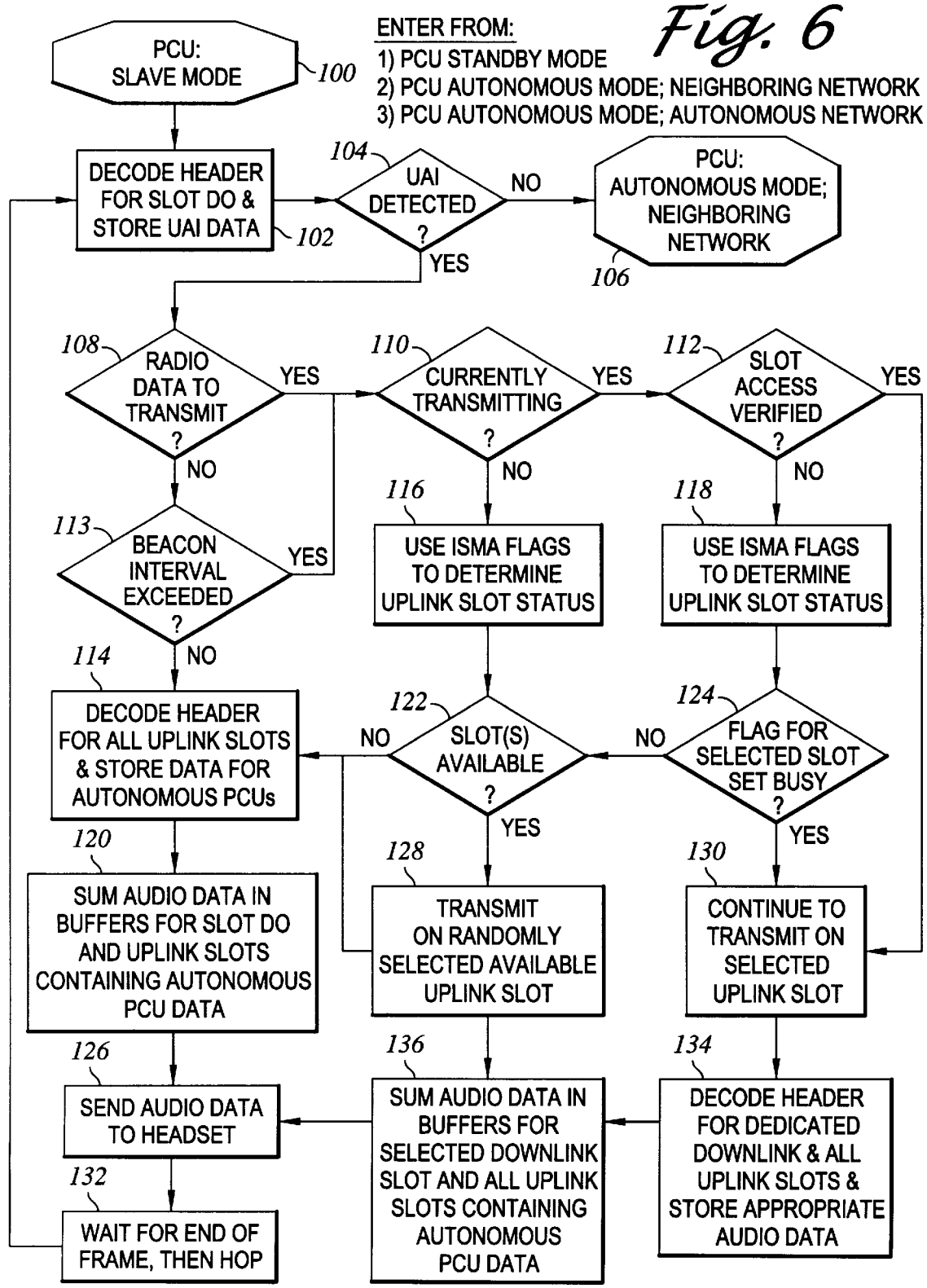
FIG. 6 is a flow chart showing the slave mode of a personal communications unit of the present invention.

With particular reference to FIG. 6, a flow chart of the PCU slave mode is provided. The PCU slave mode 100 is entered from the PCU standby mode, the PCU autonomous mode-neighboring network or the PCU autonomous network. After entering the PCU slave mode 100, the system decodes the header for slot D0, if present, and stores UAI data 102. If a UAI is not detected 104, then PCU autonomous mode-neighboring network 106 is entered. If a UAI is detected 104, then check is made to see if there is radio data to transmit 108. If not, then the header is decoded for all uplink slots and data stored for autonomous PCU's 114. Also, audio data in the buffers for slot D0 and uplink slots containing autonomous PCU data are summed 120 and audio data is sent 126 to the headset. The system then waits for the end of frame and hops 132 to the next frequency, then resumes decoding headers for slot, D0 if resent, and storing UAI data 102. When radio data to transmit is present 108, or if a beacon interval for autonomous PCU timing has been exceeded, then a check is made to see if the system is currently transmitting 110. If the system is not currently transmitting 110, then the ISMA flags received in the UAI transmissions are used to determine uplink slot status 116 and a check is made to see if a slot is available 122. If no slot is available 122, then the system decodes the header for all uplink slots and stores data for autonomous PCU's 114. If a slot is available 122, then a transmission is made on a randomly selected available uplink slot 128.

If the system is currently transmitting 110, then slot access is verified 112. If valid slot access for the current slot is yet to be verified, then the setting of the ISMA flag for the current slot is checked 124. If the flag is not set 124, then a check is made for another available slot 122.

If the flag for the selected slot busy is set 124 or if the slot access has already been verified 112, then the system continues to transmit on the selected uplink slot 130. The system decodes the header for the dedicated downlink and all uplink slots and stores available audio data 134. Audio data in the buffers for the selected downlink slot and all uplink slots containing autonomous PCU data are summed 136 and the audio data is sent to the headset 126.

Figure 7:
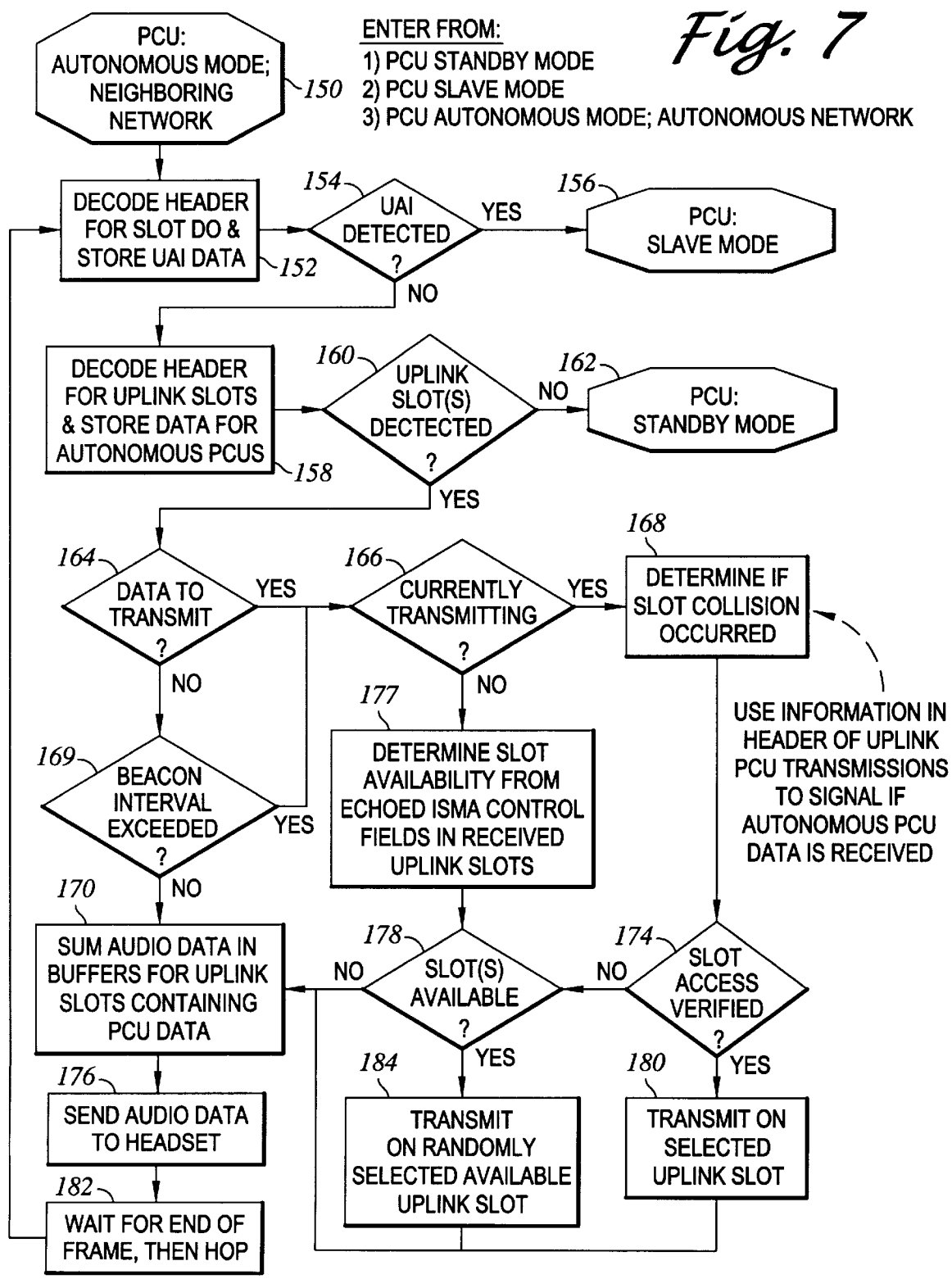
FIG. 7 is a flow chart showing the autonomous mode (neighboring network) for a personal communications unit of the present invention.

With particular reference to FIG. 7, a flow chart for the PCU autonomous mode-neighboring network is provided. The PCU autonomous mode-neighboring network is entered from the PCU standby mode, the PCU slave mode, or the PCU autonomous mode-autonomous network. If present, the header for slot D0 is decoded and UAI data is stored 152. If a UAI is detected, then the PCU slave mode is entered 156. If a UAI is not detected, then the headers for all uplink slots are decoded and data for autonomous PCUs is stored 158. If no uplink slot is detected 160, then PCU standby mode is entered 162. If an uplink slot is detected 160, then a check is made to see of there is data to transmit 164. If there is no data to transmit 164, then audio data in the buffers for uplink slots containing PCU data is summed 170 and the resulting audio data is sent 176 to the headset. Then, the system waits for the end of the current frame and hops 182 to a new frequency.

When there is data to transmit 164, or if a beacon interval for autonomous PCU timing has been exceeded, then a check is made to see if the system is currently transmitting 16If the system is not current transmitting 166, then a determination is made to see if a slot is available via the ISMA control fields received in the uplink slots 172. If no slot is available 178, then the system sums audio data in buffers for uplink slots containing PCU data 170. If a slot is available 178, then the system transmits 184 on a randomly selected available uplink slot.

When a check that the system is currently transmitting is positive 166, then a determination is made to see if a slot collision has occurred 168. This utilizes information in the headers of uplink PCU transmissions to signal if autonomous PCU data is received. If slot access is not verified, then a check is made for another available slot 178. If slot access is verified, then the PCU continues to transmit 180 in the selected uplink slot.

Figure 8:
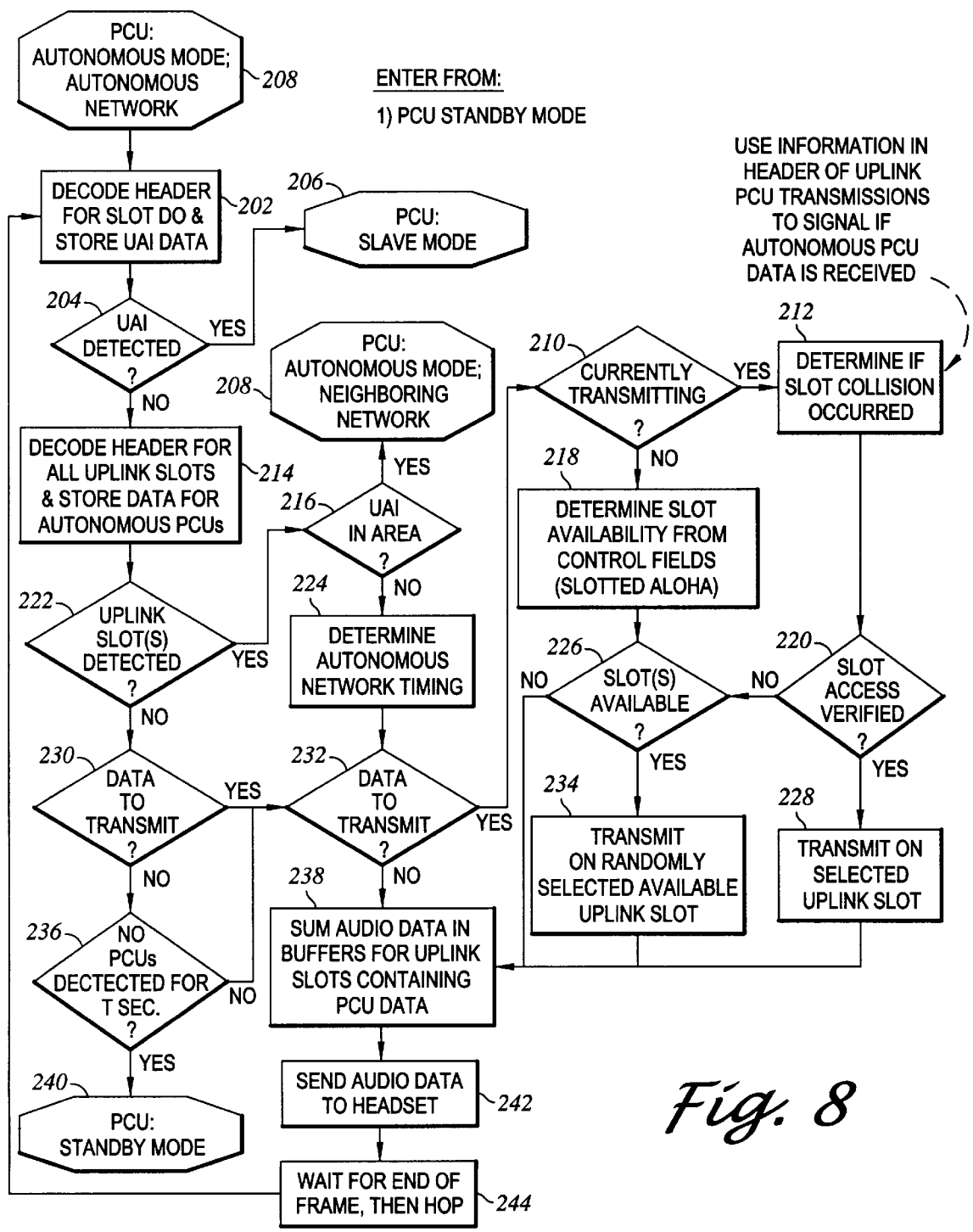
FIG. 8 is a flow chart showing the autonomous mode (autonomous network) of a personal communications unit of the present invention.

With particular reference to FIG. 8, a flow chart for the PCU autonomous mode-autonomous network is provided. The PCU autonomous mode-autonomous network 200 is entered only from the PCU standby mode. After entering the PCU autonomous mode-autonomous network 200, the system decodes the header for slot D0, if present, and stores UAI data 202. If a UAI is detected 204, then the PCU slave mode 206 is entered. If a UAI is not detected, then the system decodes the header for all uplink slots and stores data for autonomous PCUs 214. If an uplink slot is not detected 222, and no PCUs have been detected for a predetermined period of time, then the system enters the PCU standby mode 240.

If an uplink slot was detected 222, then a check is made to see if there is a UAI in the area 216. If there is a UAI in the area 216, then the PCU enters the PCU autonomous mode-neighboring network 208. If no UAI is in the area, then the autonomous network timing is determined 224. If there is no data to transmit, then audio data in the buffers for uplink slots containing PCU data is summed 238 and audio data is sent to the headset 242. Then the system waits for the end of the current frame and hops 244to a new frequency.

If there is data to transmit 230, 232, then a check is made to see if the system is currently transmitting data 210. If not, then a determination of slot availability is performed using the control fields received in the transmission of other autonomous PCUs 218, 226. If no slot is available, then the PCU sums audio data in the buffers for uplink slots containing PCU data 238. If a slot is available, then the system transmits on a randomly selected available uplink slot 234.

If the check to see if the system is currently transmitting 210 results in a positive indication, then a determination is made as to whether or not there is a slot collision 212. This uses information in the header of the received uplink PCU transmissions to signal if the previously autonomous PCU data was received.

A check is made to see if access for the selected slot has been verified 220. If slot access is not verified 220, then a check is made for additional available slots 226. If slot access is verified, then the PCU transmits in the selected uplink slot 228.

Figure 16:
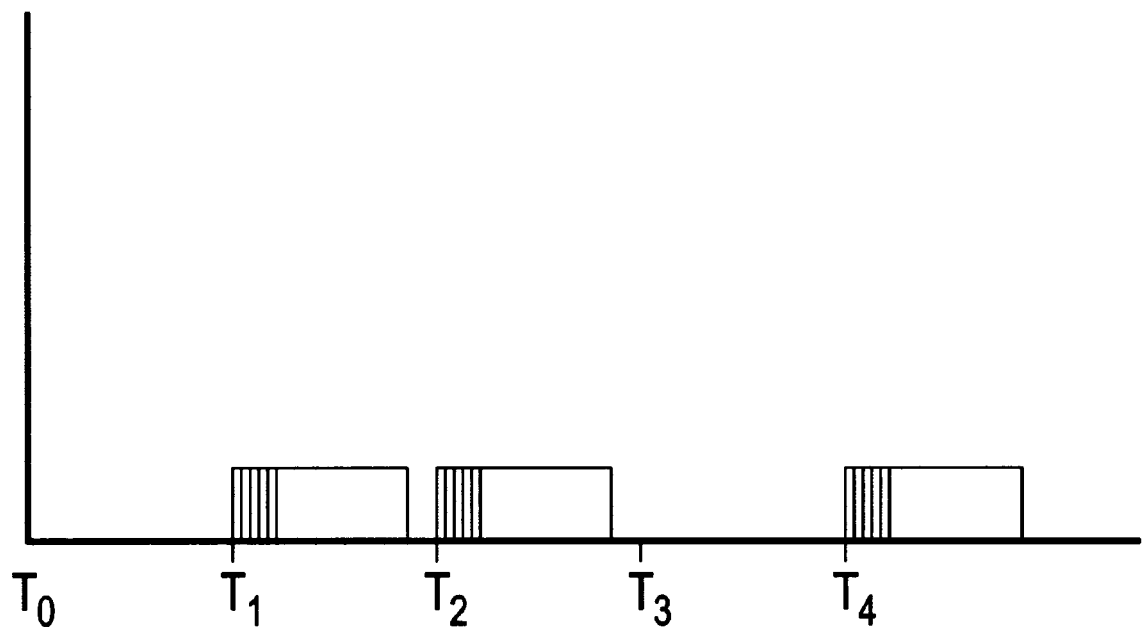
FIG. 16 is a graph showing communciations between a UAI and a PCU when the PCU is out of range with respect to the UAI.

Referring now to FIG. 16, the present invention preferably comprises a method for relaying communications from a PCU which is out of transmit range with respect to the UAI, but which is within receive range thereof. That is, the PCU is so far away from the UAI that it cannot transmit messages thereto, but the PCU is close enough to the UAI that it can receive messages therefrom. Those skilled in the art will appreciate that this is a common occurrence, since the UAI will typically have a greater power output than the PCUs.

When a first PCU is incapable of transmitting to the UAI, a second PCU which is capable of receiving communications from the first PCU and which is also capable of transmitting to the UAI, relays communications from the first PCU to the UAI.

The second PCU may sense the need to perform such relaying of communications from the first PCU to the UAI by monitoring communications between the first PCU and the UAI. During such monitoring of the communications between the first PCU and the UAI, the second PCU may notice that the first PCU is not transmitting to the UAI during its allocated time slot. Alternatively, the second PCU may notice the lack of a communication received acknowledgment in the UAIs transmission to the first PCU. As a further alternative, the first PCU may add a flag or other message to it own header indicating its inability to communicate with the UAI and thereby requesting that another PCU relay communications for it.

For example, at time $T_1$ the first PCU transmits to the UAI. Then, at time $T_2$ the UAI transmits back to the first PCU. However, if the UAI does not acknowledge receipt of the transmission from the PCU at time $T_1$, then the first PCU may not transmit during its next allocated time, i.e., at time $T_3$. At time $T_4$ the UAI attempts to again establish communications with the first PCU.

When such inability of the first PCU to transmit successfully to the UAI is noticed by a second PCU, which is capable of communicating with the UAI, then the second PCU relays communications between the first PCU and the UAI.

It is understood that the exemplary personal communication system described herein and shown in the drawings represents only a presently preferred embodiment of the invention. Indeed, various modifications and additions may be made to such embodiment without departing from the spirit and scope of the invention. Further, various modifications and additions may be obvious to those skilled the art and may be implemented to adapt the present invention for use in a variety of different applications.

What is claimed is:

1. A method for implementing a time division multiple access protocol for digital communications between a radio transceiver and a repeater, the method comprising the steps of:
    a) dividing a communication into a plurality of frames having a predetermined length of time;
    b) dividing each frame into:
        i) a plurality of downlink slots, each downlink slot for containing a transmission from the repeater to the transceiver;
        ii) a plurality of uplink slots, each uplink slot for containing a transmission from the transceiver to the repeater;
        iii) wherein each of the downlink and uplink slots are divided into:
            (a) a bit synchronization for timing acquisition field;
            (b) a slot field for slot acquisition;
            (c) a header field for control information, wherein the header field is further divided into:
                (i) a message type field for identifying a message type;
                (ii) a message subtype field for identifying a point-to-point mode of communication;
                (iii) an user-programmable ID field for identifying sending/receiving transceivers;
                (iv) a reserved field for providing subsequent additional protocol information;
                (v) a first modifier field for identifying communication channels;
                (vi) a second modifier field for identifying available uplink slots and current active slots;
        (d) a data field for digital audio and digital data information;
        (e) a 16-bit CRC field for error detection;
        (f) a slot gap field for accommodating clock inaccuracies; and
    c) transmitting the communication.

2. The method as recited in claim 1, wherein the step of dividing the communication into the plurality of frames comprises dividing the voice communication into a plurality of frames.

3. The method as recited in claim 1, wherein the step of dividing the communication into the plurality of frames comprises dividing the data communication into a plurality of frames.

4. The method as recited in claim 1, wherein the step of dividing the communication into the plurality of frames comprises dividing the communication into the plurality of frames, each frame having a length of approximately 5.12 milliseconds.

5. The method as recited in claim 1, wherein the steps of dividing each if the frames into the plurality of downlink slots and the plurality of uplink slots comprises dividing each frame into a plurality of paired downlink and uplink slots having corresponding indices.

6. The method as recited in claim 1, further comprising the step of using a Medium Access Control (MAC) algorithm to access available uplink slots.

7. The method as recited in claim 1, further comprising the steps of:
    a) a radio transceiver accessing an available uplink slot to transmit information to the repeater; and
    b) the repeater using a corresponding downlink slot to transmit information to the radio transceiver.

8. The method as recited in claim 1, further comprising the step of:
    a) defining a downlink slot $D_0$;
    b) the repeater transmitting information to radio transceivers that do not have an uplink slot via downlink slot $D_0$.

9. The method as recited in claim 1, further comprising the step of defining a frame gap intermediate adjacent frames to prevent adjacent frames from overlapping due to clock inaccuracies.

10. The method as recited in claim 1, further comprising the step of defining a frame gap intermediate adjacent frames to facilitate synthesizer re-programming in a frequency hopping spread spectrum system.

11. The method as recited in claim 1, wherein the step of dividing each downlink slot and each uplink slot into a header field comprises dividing each downlink slot and each uplink slot into a header field comprising:
    a) a message type field;
    b) a message subtype field;
    c) an ID field;
    d) a reserved field;
    e) a first modifier field; and f) a second modifier field.

12. The method as recited in claim 11, wherein the step of dividing each downlink slot and each uplink slot into the ID field comprises dividing each of the downlink slots and each of the uplink slots into the ID field that facilitates transceiver to transceiver communications.

13. The method as recited in claim 11 wherein the step of dividing each of the downlink slots and each of the uplink slots into the message type field comprises dividing each of the downlink slots and each of the uplink slots into an 8-bit message type field so as to facilitate an identification of 256 different message types.

14. A method for implementing a time division multiple access protocol for digital communications between a radio transceiver and a repeater, the method comprising the steps of:
   a) dividing a communication into a plurality of frames having a predetermined length of time;
   b) dividing each frame into:
      i) a plurality of downlink slots, each downlink slot for containing a transmission from the repeater to the transceiver;
      ii) a plurality of uplink slots, each uplink slot for containing a transmission form the transceiver to the repeater;
      iii) wherein each of the downlink and uplink slots are divided into:
         (a) a bit synchronization for timing acquisition field;
         (b) a slot field for slot acquisition;
         (c) a header field for control information, wherein the header field is further divided into:
            (i) a message type field for identifying a message type;
            (ii) a message subtype field for identifying a point-to-point mode of communications;
            (iii) an user programmable ID field for identifying sending/receiving transceivers;
            (iv) a reserved field for providing subsequent additional protocol information;
            (v) a first modifier field for identifying communication channels;
            (vi) a second modifier field for identifying available uplink slots and current active slots;
         (d) a data field for digital audio and digital data information;
         (e) a CRC field for error detection;
         (f) a slot gap field for accommodating clock inaccuracies; and
   c) transmitting the communication.

15. The method of claim 14 wherein step a) comprises dividing a voice communication into the plurality of frames.

16. The method of claim 14 wherein step a) comprises dividing a data communication into the plurality of frames.

17. The method of claim 14 wherein step a) comprises dividing the communication into the plurality of frames each having a length of approximately 5.12 milliseconds.

18. The method of claim 14 wherein step b) comprises dividing each of the frames into the plurality of paired downlink and uplink slots having corresponding indices.

19. The method of claim 14 wherein step b) further comprises utilizing a Medium Access Control (MAC) algorithm to access available uplink slots.

20. The method of claim 14 wherein step b) further comprises:
   a) defining a downlink slot $D_0$; and
   b) the repeater transmitting information via the downlink slot $D_0$ to radio transceivers without the uplink slots.

21. The method of claim 14 wherein step b) further comprises forming a frame gap intermediate adjacent frames to prevent adjacent frames from overlapping due to clock inaccuracies.

22. The method of claim 14 wherein step b) further comprises forming a frame gap intermediate adjacent frames to facilitate synthesizer re-programming in a frequency hopping spread spectrum system.

23. The method of claim 14 wherein step b)iii)(5) further comprises dividing each of the downlink and uplink slots into a 16-bit CRC field for error detection.

24. The method of claim 14 wherein step b)iii)(3)(c) further comprises dividing each of the downlink and uplink slots into the ID field that facilitates transceiver to transceiver communications.

25. The method of claim 14 wherein step b)iii)(3)(a) further comprises dividing each of the downlink and uplink slots into an 8-bit message type field to facilitate an identification of 256 different message types.

26. The method of claim 14 wherein step c) further comprises:
   a) the radio transceiver transmitting information via an available uplink slot to the repeater; and
   b) the repeater transmitting information via a corresponding downlink slot to the radio transceiver.

27. A method for implementing a time division multiple access protocol for communication between a repeater and at least one radio transceiver, the method comprising the steps of:
   a) segmenting a voice communication into a plurality of frames having a predetermined length of time;
   b) segmenting each frame into a plurality of downlink and uplink slots, each downlink slot having transmissions from the repeater to the transceiver(s) therein, each uplink slot having transmissions from the receiver(s) to the repeater therein;
   c) wherein each of the downlink and uplink slots are divided into:
      i) a bit synchronization for timing acquisition field;
      ii) a slot field for slot acquisition;
      iii) a header field for control information, wherein the header field is further divided into:
         (a) a message type field for identifying a message type;
         (b) a message subtype field for identifying a point-to-point mode of communications;
         (c) an user-programmable ID field for identifying sending/receiving transceivers;
         (d) a reserved field for providing subsequent additional protocol information;
         (e) a first modifier field for identifying communication channels;
         (f) a second modifier field for identifying available uplink slots and current active slots;
      iv) a data field for digital audio and digital data information;
      v) a 16-bit CRC field for error detection;
      vi) a slot gap field for accommodating clock inaccuracies;
   d) transmitting the voice communication.

28. The method of claim 27 wherein step a) comprises segmenting a digital communication into the plurality of frames.

29. The method of claim 27 wherein step a) comprises segmenting a data communication into the plurality of frames.

30. The method of claim 27 wherein step a) comprises segmenting the communication into the plurality of frames each having a length of approximately 5.12 milliseconds.

31. The method of claim 27 wherein step b) comprises segmenting each of the frames into the plurality of paired downlink and uplink slots having corresponding indices.

32. The method of claim 27 wherein step b) further comprises utilizing a Medium Access Control (MAC) algorithm to access available uplink slots.

33. The method of claim 27 wherein step b) further comprises:

a) defining a downlink slot $D_0$; and b) the repeater transmitting information via the downlink slot $D_0$ to radio transceivers without the uplink slots.

34. The method of claim 27 wherein step b) further comprises forming a frame gap intermediate adjacent frames to prevent adjacent frames from overlapping due to clock inaccuracies.

35. The method of claim 27 wherein step b) further comprises forming a frame gap intermediate adjacent frames to facilitate synthesizer reprogramming in a frequency hopping spread spectrum system.

36. The method of claim 27 wherein step b) further comprises segmenting each of the downlink and uplink slots into:

a) a bit synchronization for timing acquisition field;

b) a slot field for slot acquisition;

c) a header field for control information;

d) a data field for digital audio and digital data information;

e) a CRC field for error detection; and f) a slot gap field for accommodating clock inaccuracies.

37. The method of claim 36 wherein step c) further comprises segmenting the header field into:

a) a message type field;

b) a message subtype field;

c) an ID field;

d) a reserved field; e) a first modifier field; and f) a second modifier field.

38. The method of claim 37 wherein step a) further comprises segmenting each of the downlink and uplink slots into an 8-bit message type field to facilitate identification of 256 different message types.

39. The method of claim 36 wherein step e) further comprises segmenting each of the downlink and uplink slots into a 16-bit CRC field.

40. The method of claim 27 wherein step c) further comprises:

a) the radio transceiver(s) transmitting information via an available uplink slot to the repeater; and b) the repeater transmitting information via a corresponding downlink slot to the radio transceiver(s).

* * * * *